(12) United States Patent
Suzuki (10) Patent No.: US 9,929,383 B2
(45) Date of Patent: Mar. 27, 2018

(54) BATTERY STACK

(71) Applicant: TOYOTA JIDOSHA KABUSHIKI KAISHA, Toyota-shi, Aichi-ken (JP)

(72) Inventor: Satoshi Suzuki, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 96 days.

(21) Appl. No.: 14/913,045

(22) PCT Filed: Aug. 11, 2014

(86) PCT No.: PCT/IB2014/001499
§ 371 (c)(1),
(2) Date: Feb. 19, 2016

(87) PCT Pub. No.: WO2015/025198
PCT Pub. Date: Feb. 26, 2015

(65) Prior Publication Data
US 2016/0204399 A1 Jul. 14, 2016

(30) Foreign Application Priority Data
Aug. 21, 2013 (JP) ................. 2013-171653

(51) Int. Cl.
*H01M 2/08* (2006.01)
*H01M 2/02* (2006.01)
(Continued)

(52) U.S. Cl.
CPC ............. *H01M 2/08* (2013.01); *H01M 2/024* (2013.01); *H01M 2/0217* (2013.01);
(Continued)

(58) Field of Classification Search
CPC ........... H01M 2/02; H01M 2/04; H01M 10/60
(Continued)

(56) References Cited

U.S. PATENT DOCUMENTS

| 6,232,015 B1 | 5/2001 | Wyser |
| 2006/0051666 A1 | 3/2006 | Kim |

(Continued)

FOREIGN PATENT DOCUMENTS

| CN | 101765932 A | 6/2010 |
| JP | 09-199089 A | 7/1997 |

(Continued)

OTHER PUBLICATIONS

International Search Report and Written Opinion for corresponding International Application No. PCT/IB2014/001499 dated Nov. 25, 2014.

*Primary Examiner* — James Lee
(74) *Attorney, Agent, or Firm* — Sughrue Mion, PLLC (57) ABSTRACT

A battery stack includes a plurality of battery packs and a plurality of spacers. The battery pack each has a case and a sealing plate. The sealing plate is fitted to an inner peripheral surface of an opening of the case. Each of the plurality of spacers is arranged at the center of a flat surface on each side of the battery pack, and a contour of a contact region of the spacer with the flat surface is smaller than a contour of the flat surface of the battery pack. The plurality of spacers and the plurality of battery packs are alternately stacked. The plurality of spacers and the plurality of battery packs are applied with a load in a stacking direction. The center of the flat surface of the battery pack is recessed in a shape of a contour of the spacer by the load.

3 Claims, 8 Drawing Sheets (51) Int. Cl.
- *H01M 10/04* (2006.01)
- *H01M 10/0525* (2010.01)
- *H01M 10/0585* (2010.01)
- *H01M 10/34* (2006.01)
- *H01M 2/04* (2006.01)
- *H01M 2/10* (2006.01)
- *H01M 10/42* (2006.01)

(52) U.S. Cl.
CPC ....... *H01M 2/0285* (2013.01); *H01M 2/0426* (2013.01); *H01M 2/1061* (2013.01); *H01M 2/1077* (2013.01); *H01M 10/0413* (2013.01); *H01M 10/0468* (2013.01); *H01M 10/0481* (2013.01); *H01M 10/0525* (2013.01); *H01M 10/0585* (2013.01); *H01M 10/345* (2013.01); *H01M 10/4207* (2013.01); *H01M 2200/20* (2013.01); *H01M 2220/20* (2013.01)

(58) Field of Classification Search
USPC .......................................................... 429/152
See application file for complete search history.

(56) References Cited

U.S. PATENT DOCUMENTS

2010/0190049 A1   7/2010   Kawase et al.
2010/0216004 A1*  8/2010   Yoon ................... H01M 2/0242
                                              429/99

FOREIGN PATENT DOCUMENTS

| | | |
|---|---|---|
| JP | 2003-242956 A | 8/2003 |
| JP | 2006-040879 A | 2/2006 |
| JP | 2009-026703 A | 2/2009 |
| JP | 2013-118152 A | 6/2013 |
| WO | 2013/084290 A1 | 6/2013 |

* cited by examiner

| C (mm) | B (mm) | B/C | NUMBER OF REPETITIONS OF LOAD UNTIL BREAKAGE BY FATIGUE (TIMES) |
|---|---|---|---|
| 8.9 | 0 | 0.00 | 100 |
| 8.9 | 0.1 | 0.01 | 2000 |
| 8.9 | 0.2 | 0.02 | 7000 |
| 8.9 | 0.245 | 0.03 | 18000 |
| 8.9 | 0.3 | 0.03 | 20000 |
| 8.9 | 0.4 | 0.04 | 24000 |
| 8.9 | 0.425 | 0.05 | 23400 |
| 8.9 | 0.5 | 0.06 | 23000 |
| 8.9 | 0.6 | 0.07 | 22000 |
| 8.9 | 0.605 | 0.07 | 21900 |
| 8.9 | 0.7 | 0.08 | 15000 |
| 8.9 | 0.8 | 0.09 | 9950 |
| 8.9 | 0.9 | 0.10 | 3000 |
| 8.9 | 1 | 0.11 | 200 |
| 8.9 | 1 | 0.11 | 1 |
| 8.9 | 1.2 | 0.13 | 1 |
| 8.9 | 1.3 | 0.15 | 1 |
| 8.9 | 0.4 | 0.04 | 24000 |
| 6.0 | 0.4 | 0.07 | 22500 |
| 4.0 | 0.4 | 0.10 | 3250 |
| 2.0 | 0.4 | 0.20 | 1 |
| 1.0 | 0.4 | 0.40 | 1 |

BATTERY STACK

BACKGROUND OF THE INVENTION

1. Field of the Invention

The present invention relates to a battery stack that is configured of a plurality of battery packs. In the battery stack in which the plurality, of battery packs is stacked, the individual battery pack is sometimes referred to as a "battery cell" or simply as a "cell".

2. Description of Related Art

There is a case where a high-voltage or large-capacity battery is realized by connecting a plurality of battery packs in series or in parallel. Such a battery is referred to as a battery stack. The individual battery pack tends to have a flat shape. Japanese Patent Application Publication No. 2003-242956 (JP 2003-242956 A) discloses a battery stack in which a plurality of flat battery packs is aligned and connected in series.

For the battery pack, a representative example of which is a lithium-ion battery, an electrolyte and a battery main body are housed in a sealed flat case. Since the case is sealed, an internal pressure thereof is increased, and the case is inflated in a case of a temperature increase or in a case where the case is brought to a high elevation place where the atmospheric pressure is low. In addition, the battery pack generates heat when being charged. Thus, every time the battery pack is charged, the case is inflated.

A technique of preventing inflation of the case that is caused by an increase in the internal pressure is disclosed in Japanese Patent Application Publication No. 2006-040879 (JP 2006-040879 A), for example. The technique is to provide a trapezoidal recess or a trapezoidal projection at the center of a flat surface of a flat case, so as to enhance strength of the case. Here, the flat surface of the flat case corresponds to a lateral surface with the largest area of the case and is also referred to as a wide surface.

SUMMARY OF THE INVENTION

The sealed case is often realized by welding a flat case main body and a sealing plate (lid). When such a case is repeatedly inflated and contracted, a welded portion is deteriorated by fatigue. Thus, the present invention provides a battery stack that can suppress deterioration by fatigue of a welded portion between a case main body and a sealing plate, which is caused by an increase in internal pressure.

A battery stack according to a first aspect of the present invention includes a plurality of battery packs and a plurality of spacers. The battery pack each has a case and a sealing plate. The case houses a battery main body therein. The case is, flat, and has a opening. The opening is narrow width. The sealing plate is fitted to an inner peripheral surface of the opening of the case. A lateral surface of the sealing plate is welded to the inner peripheral surface of the case. Each of the plurality of spacers is arranged at a center of a flat surface on each side of the battery pack, and a contour of a contact region of the spacer with the flat surface is smaller than a contour of the flat surface of the battery pack. The plurality of spacers and the plurality of battery packs are alternately stacked. The plurality of spacers and the plurality of battery packs are applied with a load in a stacking direction, and the center of the flat surface of the battery pack is recessed in a shape of a contour of the spacer by the load. Here, a contact surface of the spacer with the battery pack only needs to be smaller than the contour of the flat surface of the battery pack, and the spacer may be larger than the flat surface in a portion thereof that does not contact the battery pack.

In the battery pack included in the battery stack according to the first aspect of the present invention, a majority of a welded surface between the opening of the flat case and the sealing plate corresponds to a welded portion that is parallel to the flat surface. The welded surface that is parallel to the flat surface is a welded surface that includes a long side of the opening of the narrow width surface of the case. Here, since strength of the case is high in the vicinity of a short side, inflation of the case in the vicinity of the short side is not focused herein. What is focused herein in terms of the inflation of the case due to the increase in the internal pressure of the case is the welded surface that includes the long side of the opening. That is the welded surface in a central portion of the long side. It is because the central portion of the long side of the opening is most likely to be inflated when the internal pressure is increased.

In the battery stack according to the first aspect of the present invention, in order to arrange the welded surface that includes the long side of the rectangular opening to be parallel to the flat surface of the case, the sealing plate is fitted to the case such that the inner peripheral surface of the opening of the flat case abuts against the lateral surface of the sealing plate, and an abutment surface is welded. Meanwhile, the plurality of battery packs is stacked with the spacer being interposed between the adjacent two of the plurality of battery packs, and the load is applied thereto in the stacking direction. Due to the load, the flat case is suppressed from being inflated even when the internal pressure thereof is increased. As a result, the opening of the case is less likely to be expanded in a width direction (a direction orthogonal to the flat surface). In other words, the inner peripheral surface of the opening of the case is less likely to be separated from the lateral surface of the sealing plate. As a result, stress that acts on the welded surface during the increase in the internal pressure is relaxed, and the deterioration by fatigue is thereby suppressed.

In the battery stack according to the first aspect of the present invention, a relationship between a depth and a distance may satisfy $0.005 \leq B/C \leq 0.11$ in a cross section of the battery pack and the spacer. The cross section crosses the sealing plate and the spacer in the stacking direction. Here, B represents a depth of the recess, and C represents a distance from a lower end of the sealing plate to an upper end of the spacer. In addition, the above relationship may satisfy $0.02 \leq B/C \leq 0.09$. The inventor conducted a comparative study by changing magnitudes of the load to be applied. As a result, it was discovered that the deterioration by fatigue was likely to be progressed when the load was excessively large. In an assumption, it is because, when the load is excessively large, a force in a direction to the outside of the opening acts on an upper end of the flat surface (that corresponds to an upper end of a contact region with the lateral surface of the sealing plate), and tensile stress is applied to an upper portion of the welded surface with the lateral surface of the sealing plate. The inventor also has found that, in order to limit the appropriate magnitude of the load, use of a ratio B/C of a depth B of the recess formed in the flat surface by the load to a distance C from a lower end of the contact region between the flat surface and the sealing plate to the upper end of the contact region between the flat surface and the spacer as a parameter is appropriate when the battery pack is seen in the cross section that crosses the sealing plate and the spacer in the stacking direction. The inventor changed the B/C variously and conducted a repeated test in which the internal pressure is increased. The repeated test was repeated until the welded portion was broken. As a result, when 0.005≤B/C≤0.11 was satisfied, the welded portion was not broken until the number of repetitions became twice as many as the number of repetitions with no load. Furthermore, the welded portion was durable against the repeated test of approximately 7,000 times or more when 0.02≤B/C≤0.09 was satisfied. This number is important for the durability against fatigue. If it is assumed that the inflation occurs twice a day, the inflation is repeated 7,300 times for 10 years. For example, as an evaluation standard of the service life of the battery stack that is mounted in an automobile, it is preferred that the service life is 10 years or longer. Such a standard is passed when 0.02≤B/C≤0.09 is satisfied.

A battery stack according to a second aspect of the present invention includes a plurality of battery packs and a plurality of spacers. The battery pack each has a case and a sealing plate. The case houses a battery main body therein. The case is flat, and has a opening. The opening is narrow width. The sealing plate is fitted to an inner peripheral surface of the opening of the case. A lateral surface of the sealing plate is welded to the inner peripheral surface of the case. Each of the plurality of spacers is arranged at the center of a flat surface on each side of the battery pack, and a contour of a contact region of the spacer with the flat surface is smaller than a contour of the flat surface of the battery pack. The plurality of spacers and the plurality of battery packs are alternately stacked. The plurality of spacers and the plurality of battery packs are applied with a load in a stacking direction, and the center of the flat surface of the battery pack is recessed in a shape of the contour of the spacer by the load. The flat surface is linearly inclined with respect to a direction orthogonal to the stacking direction from a lower end of a contact region between the flat surface and the sealing plate to an upper end of the contact region between the flat surface and the spacer in a cross section of the battery pack and the spacer. The cross section crosses the sealing plate and the spacer in the stacking direction.

In the battery stack according to the second aspect of the present invention, the center of the flat surface of the case is recessed in the shape of the spacer by receiving the load. In addition, the flat surface is linearly inclined with respect to the direction orthogonal to the stacking direction from the lower end of the contact region between the flat surface (a back surface thereof) and the lateral surface of the sealing plate to the upper end of the contact region between the flat surface and the spacer. This shape contributes to enhanced strength of the case. Due to a synergistic effect of the load and improved strength of the case, it is possible to effectively suppress an opening of the case from being expanded by an increase in internal pressure, and thus deterioration by fatigue of the battery stack can be suppressed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
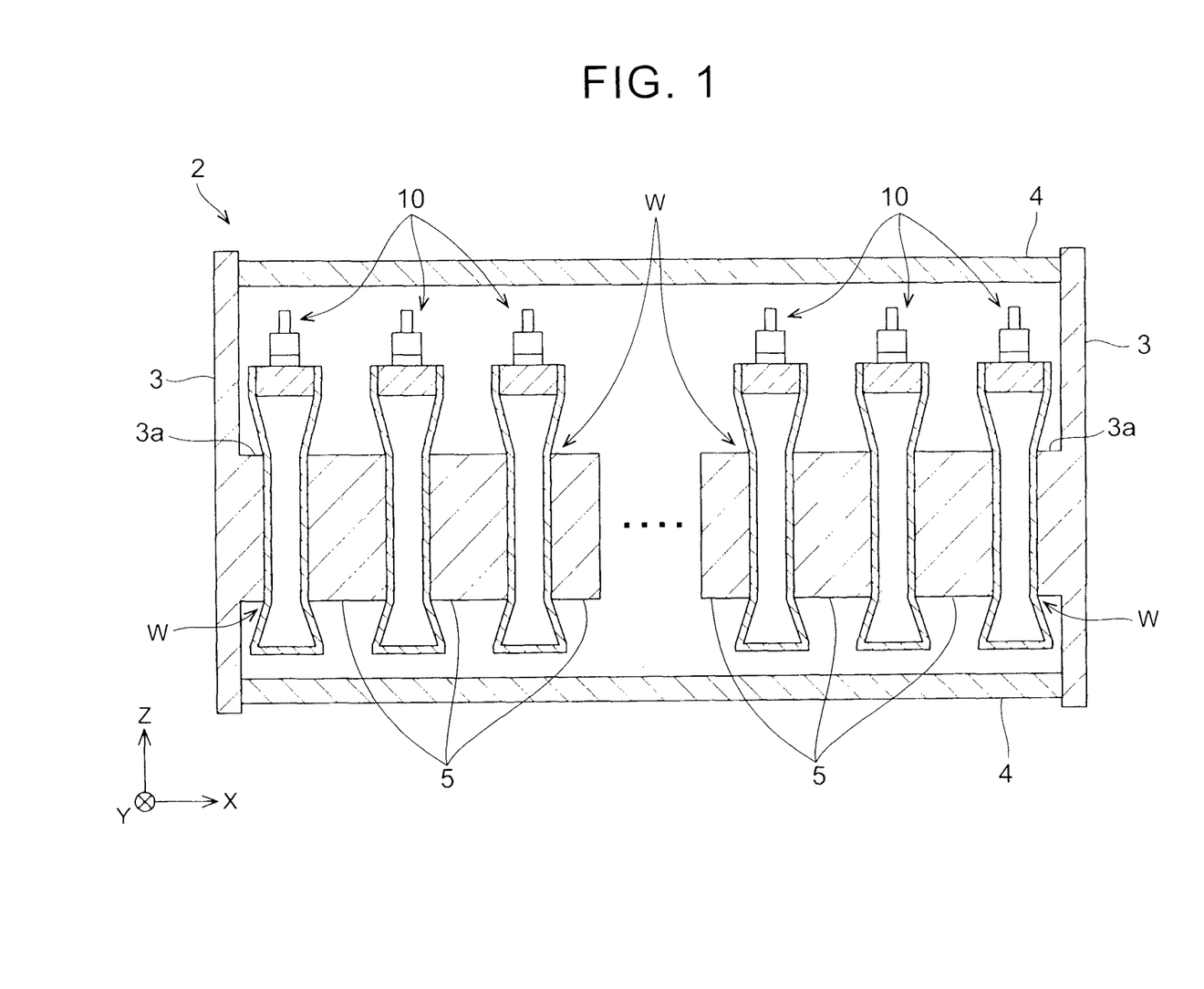
FIG. 1 is a schematic cross-sectional view of a battery stack in an embodiment.
Figure 2A:
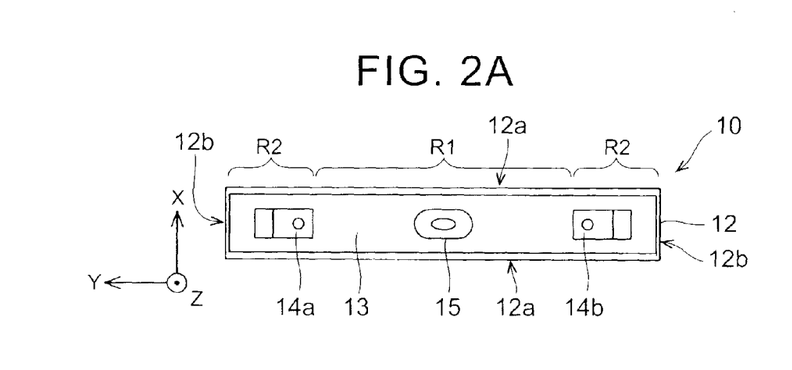
FIG. 2A is a top view of a battery pack.
Figure 2B:
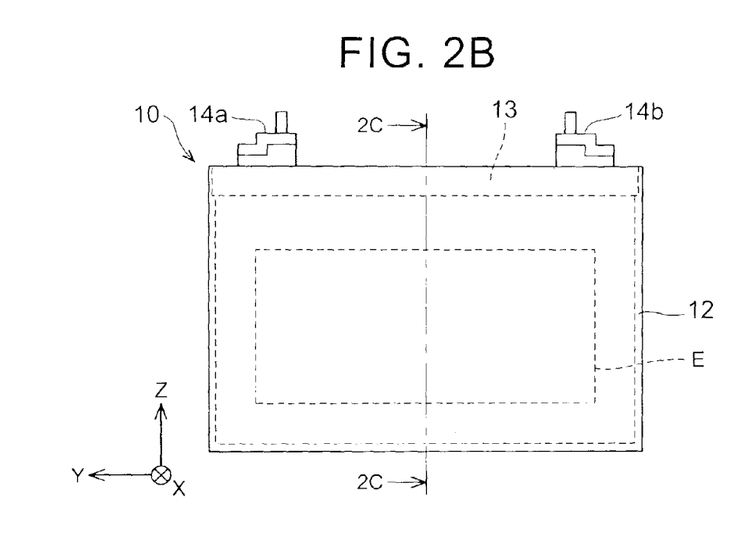
FIG. 2B is a front view of the battery pack.
Figure 2C:
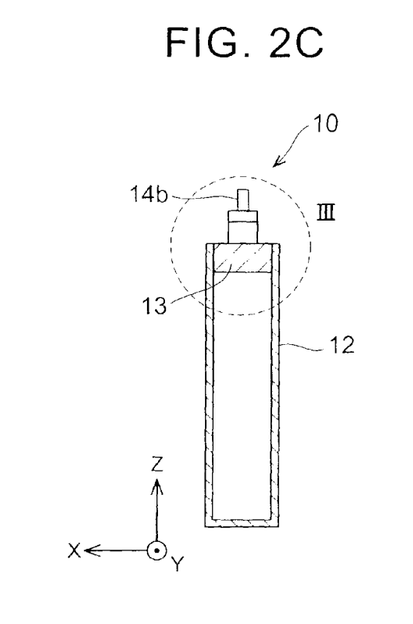
FIG. 2C is a cross-sectional view of the battery pack that is taken along the 2C-2C line in FIG. 2B.

A description will be made on a battery stack of an embodiment with reference to the drawings. FIG. 1 is a schematic cross-sectional view of the battery stack, and FIG. 2A to FIG. 2C are three side views of a battery pack. A battery stack 2 has a structure in which a plurality of flat battery packs 10 is stacked with a spacer 5 interposed between two each of the plurality of battery packs 10. The plurality of battery packs 10 is stacked such that flat surfaces thereof face each other. The flat surface corresponds to a lateral surface with the largest area of the battery pack 10 whose external shape is flat. A stacked body that includes the plurality of battery packs 10 and the plurality of spacers 5 is interposed between metallic end plates 3, and the end plates 3 on both sides of the stacked body are connected by restraining belts 4 to be retained. The restraining belt 4 is an elastic body such as rubber, and applies a compressive force to the end plates 3 on both of the sides. The compressive force then applies a load to the stacked body of the battery packs 10 and the spacers 5. As will be described below, when no load is applied, the flat surface of the battery pack 10 is even. However, when receiving the load, the flat surface is formed with a recess W at the center thereof. A shape of a bottom of the recess W corresponds to an external shape of an, abutment surface of the spacer 5 against the battery pack 10. Here, a projection 3a in a same shape as the spacer 5 is provided on a lateral surface of the end plate, and the recess W is also formed in the flat surface of the outermost battery pack 10.

The battery pack 10 will be described with reference to FIG. 2A to FIG. 2C. The battery pack 10 has a flat external shape, and positive and negative terminals 14a, 14b are provided in one narrow width surface. Here, for convenience of the description, a surface side on which the terminals 14a, 14b are provided is referred as an upper side, while a surface side that is opposed to the surface provided with the terminals 14a, 14b is referred to as a lower side. In a coordinate system shown in each of the drawings, a positive direction of an Z-axis corresponds to the "upper side". A lateral surface that is parallel to a YZ-plane in the coordinate system in each of the drawings corresponds to the flat surface.

FIG. 2A to FIG. 2C are three side views of the battery pack 10, and FIG. 2C corresponds to a side view. Here, in order to facilitate understanding, FIG. 2C shows a cross section that is taken along the line 2C-2C in FIG. 2B. FIG. 2C corresponds to a cross section that crosses a sealing plate 13 and a case 12 in a stacking direction of the battery pack 10 and the spacer 5. Furthermore, this cross section can be expressed as a cross section that simultaneously crosses the case 12 and the sealing plate 13 and also a cross section that is parallel to the stacking direction.

The cross section in FIG. 2C corresponds to the cross section of the battery pack shown in FIG. 1. It should be noted however that the flat surface is even when no load is applied thereto in the stacking direction as described above and that the above-mentioned recess W is not formed. FIG. 2B is a view of the flat surface that is seen from the front. A rectangular shape indicated by the reference symbol E indicates a contour of a region that is brought into contact with the spacer 5. As shown in FIG. 2B, the spacer 5 is applied to the center of the flat surface.

The battery pack 10 houses a battery main body in a casing. However, since this specification focuses on the casing of the battery pack, the battery main body is not shown. Here, the battery main body is typically a chemical battery such as a lithium-ion battery or nickel-hydrogen battery, but may be a fuel cell.

The casing of the battery pack 10 is configured of the flat case 12, in which the narrow width surface as an upper surface is opened, and the sealing plate 13 for sealing the opening. When the above-mentioned definitions of the "upper side" and the "lower side" are followed, the sealing plate 13 corresponds to the upper surface of the battery pack 10.

The casing of the battery pack 10 is sealed. Since the lithium-ion battery or the nickel-hydrogen battery generates heat when being charged, an internal pressure is increased by a temperature increase. In addition, the internal pressure of the sealed casing is increased when the casing is brought to a high elevation place where the atmospheric pressure is low. As a measure against an increase in the internal pressure, a safety valve 15 is provided in the upper surface (that is, the sealing plate 13) of the battery pack 10. The safety valve 15 is opened when the internal pressure of the case exceeds a specified threshold value. The safety valve 15 also serves as a safety device and interrupts conduction between the battery main body on the inside and one of the terminals at the same time as it is opened.

The sealing plate 13 is fitted to an inner peripheral surface of the opening of the case 12, and a lateral surface of the sealing plate 13 is welded to the inner peripheral surface of the case 12. The sealing plate 13 is welded for an entire periphery thereof, and the case is thus sealed. The casing of the battery pack is sealed. Thus, as described above, when the internal pressure is increased, the case 12 is inflated. During inflation, of a welded region between the opening of the case 12 and the sealing plate 13, the case has high rigidity in a periphery R2 of a short side 12b (see FIG. 2A) of the rectangular opening of the case. Accordingly, the case is not significantly deformed in the periphery R2 when the internal pressure is increased. On the other hand, in the vicinity of the center R1 of a long side 12a, the deformation caused by the increase in the internal pressure becomes significant. Since the internal pressure acts in a direction to expand the opening of the case 12, tensile stress is applied to the welding between the opening and the sealing plate 13.

Figure 3:
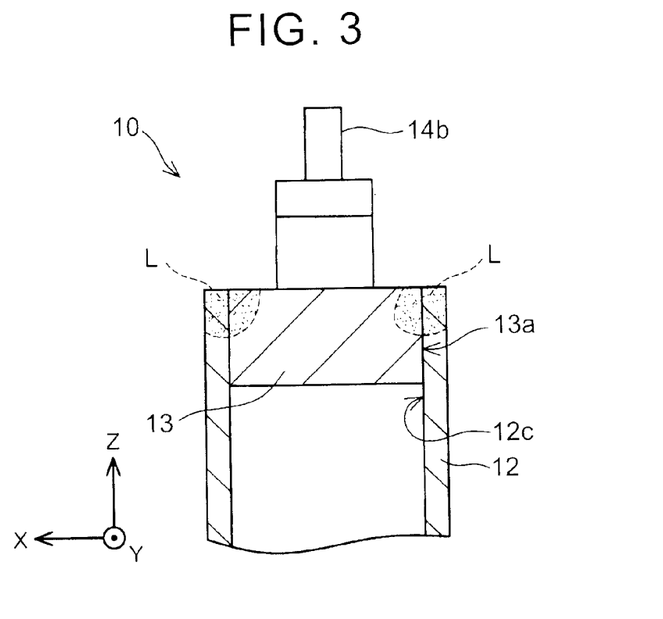
FIG. 3 is an enlarged cross-sectional view of a range that is indicated by the reference numeral III in FIG. 2.
Figure 4:
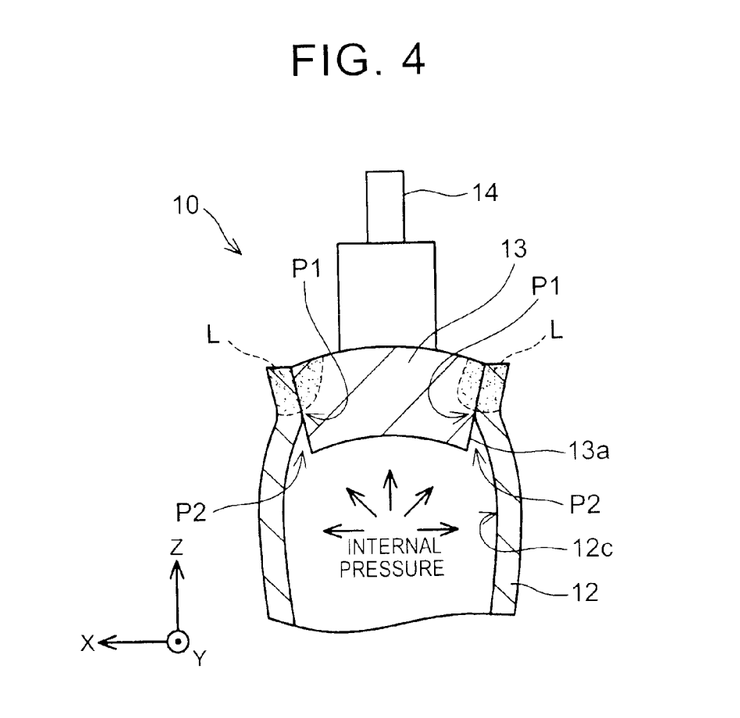
FIG. 4 is a cross-sectional view for illustrating inflation of a case when an internal pressure is increased.

A force applied to a welded section is described with reference to FIG. 3 and FIG. 4. FIG. 3 and FIG. 4 are enlarged cross-sectional view of a range that is indicated by the reference numeral III in FIG. 2C. Dotted hatching indicated by the reference symbol L represents the welded region. The welding is performed by laser welding. The laser is irradiated parallel to a contact surface between a lateral surface 13a of the sealing plate 13 and an inner surface 12c of the case 12. In an irradiated region, the sealing plate 13 and the case 12 are each melted to a specified depth and joined to each other. When the intensity of the laser is excessively high, the laser penetrates the sealing plate 13. Accordingly, luminance of the laser is adjusted to prevent the penetration. As a result, a range to be welded is limited to an upper portion of the contact surface between the lateral surface 13a of the sealing plate 13 and the inner surface 12c of the case 12 (a portion of the contact surface in the vicinity of the outer side of the case). The inner surface 12c in FIG. 3 corresponds to a back side of the flat surface.

FIG. 4 shows a state in which the internal pressure of the casing is increased and in which the vicinity of the opening of the case 12 is thereby inflated. Once the internal pressure is increased, the case 12 is inflated, and an unwelded range of the contact surface between the lateral surface 13a of the sealing plate and the inner surface 12c of the case (the back side of the flat surface), which originally contact each other, starts opening (a portion indicated by the reference symbol P2 in FIG. 4). This causes concentration of stress at a lower end of the welded region (an end that is closest to the inside of the case and indicated by the reference symbol P1). At this stress concentration point, the deterioration by fatigue is progressed at the fastest pace.

Figure 5:
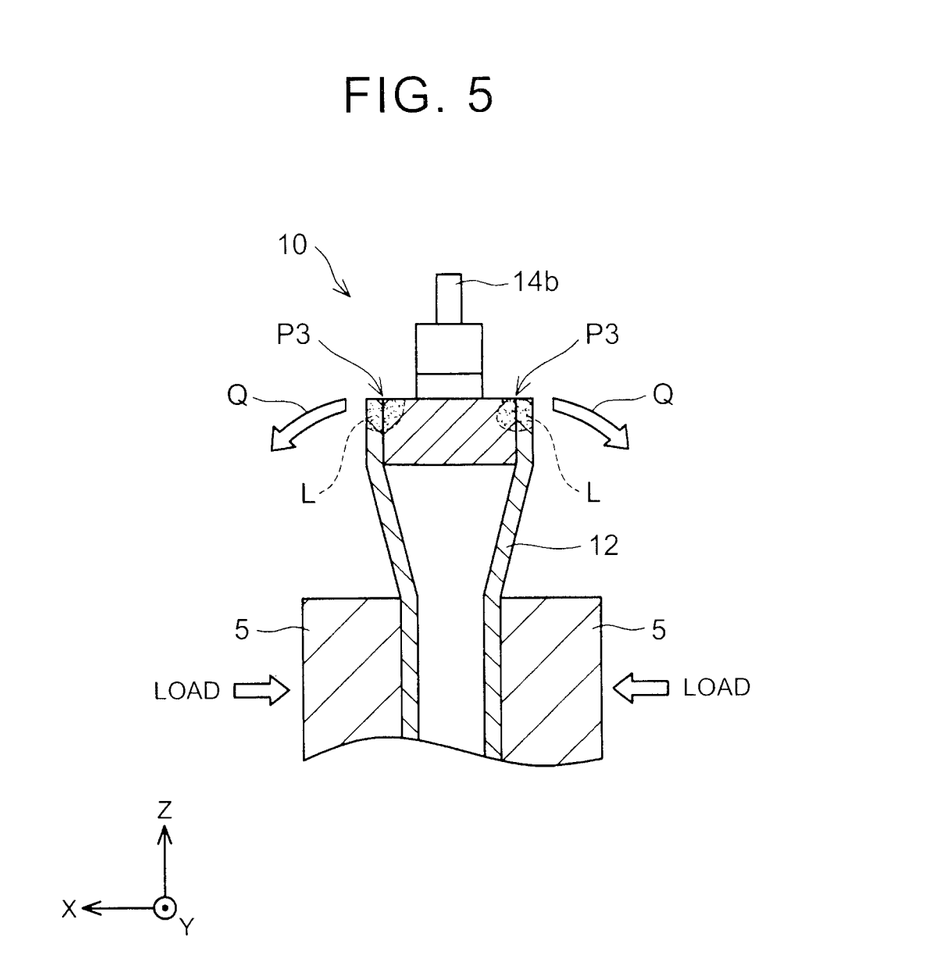
FIG. 5 is an enlarged cross-sectional view of the battery pack to which a load is applied.

In the battery stack of this embodiment, a welded surface between the sealing plate 13 and the case 12 on the long side (see FIG. 2A) of the rectangular opening of the flat case 12 is identified so as to be parallel to the flat surface, and the load is applied to the flat surface from the outside through the spacer 5. FIG. 5 shows a partial cross-sectional view of the battery pack 10 when the load is applied. Since the load acts to press the flat surface, it can suppress the inflation of the case. As a result, the stress applied to the welded surface is reduced, and thus the deterioration by fatigue is suppressed.

If the load is excessively increased, as shown in FIG. 5, a force in a direction that is indicated by an arrow Q is applied to an upper end of the welded surface (a portion indicated by the reference symbol P3). The force acts to separate the welded surface, thereby promoting the deterioration by fatigue of the welding. Next, an appropriate range of the load will be described.

An appropriate magnitude of the load depends on the size of the battery pack. Thus, it is inadvisable to identify the appropriate load by an absolute value. The inventor found that the appropriate magnitude of the load could be identified by a ratio of lengths of particular portions of the battery pack. A method of identifying the appropriate range of the load will be described with reference to FIG. 6.

Figure 6:
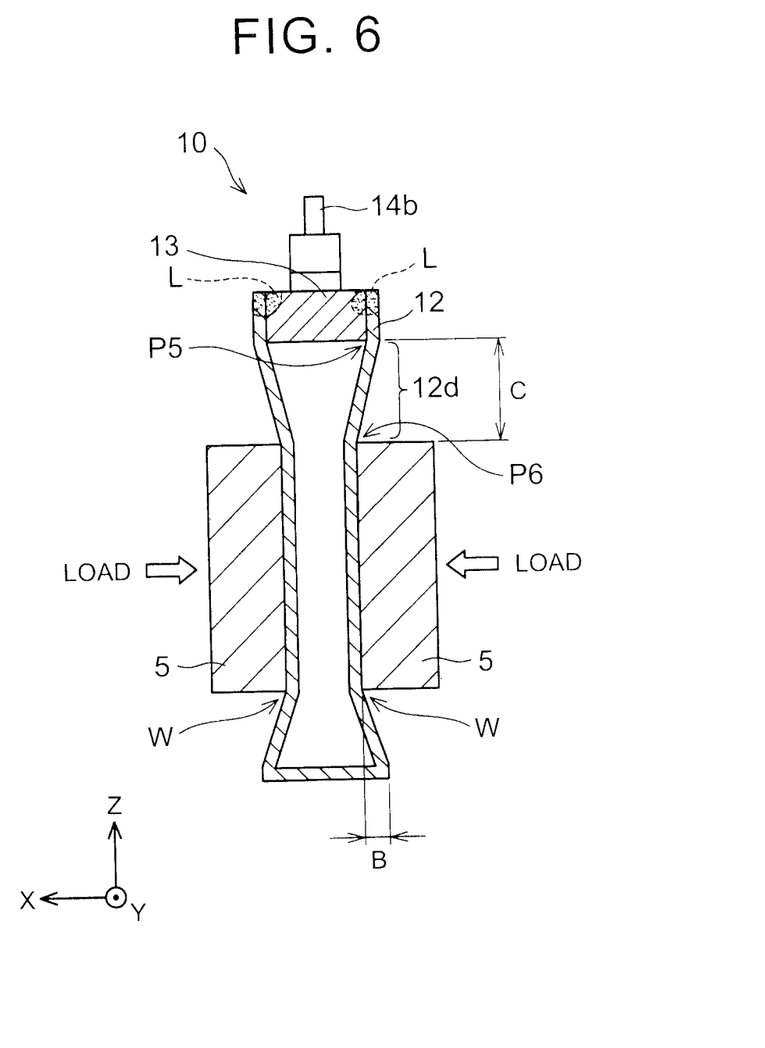
FIG. 6 is a cross-sectional view of the battery pack in a state that the load is applied thereto.

When the load is increased through the spacer 5, as shown in FIG. 6 (and FIG. 1), the flat surface is formed with the recess W that has a bottom shaped in the contour of the spacer 5. The magnitude of the load that suppresses the deterioration by fatigue of the welded portion can be identified by a ratio B/C of a depth B of the recess to a distance C, which will be described next. The distance C is a distance from a lower end (a portion indicated by the reference symbol P5 in FIG. 6) of a contact region between the flat surface of the case 12 and the lateral surface of the sealing plate 13 to an upper end (a portion indicated by the reference symbol P6 in FIG. 6) of a contact range between the flat surface and the spacer 5 when the battery pack is seen in the cross section that crosses the sealing plate 13 and the spacer 5 in the stacking direction. When no load is applied, the flat surface is even. However, when the load is applied and the recess W is formed, the flat surface between the lower end P5 and the upper end P6 (a partial flat surface 12d) is linearly inclined with respect to a plane that is orthogonal to the stacking direction (the YZ-plane in the drawing).

Figure 7:
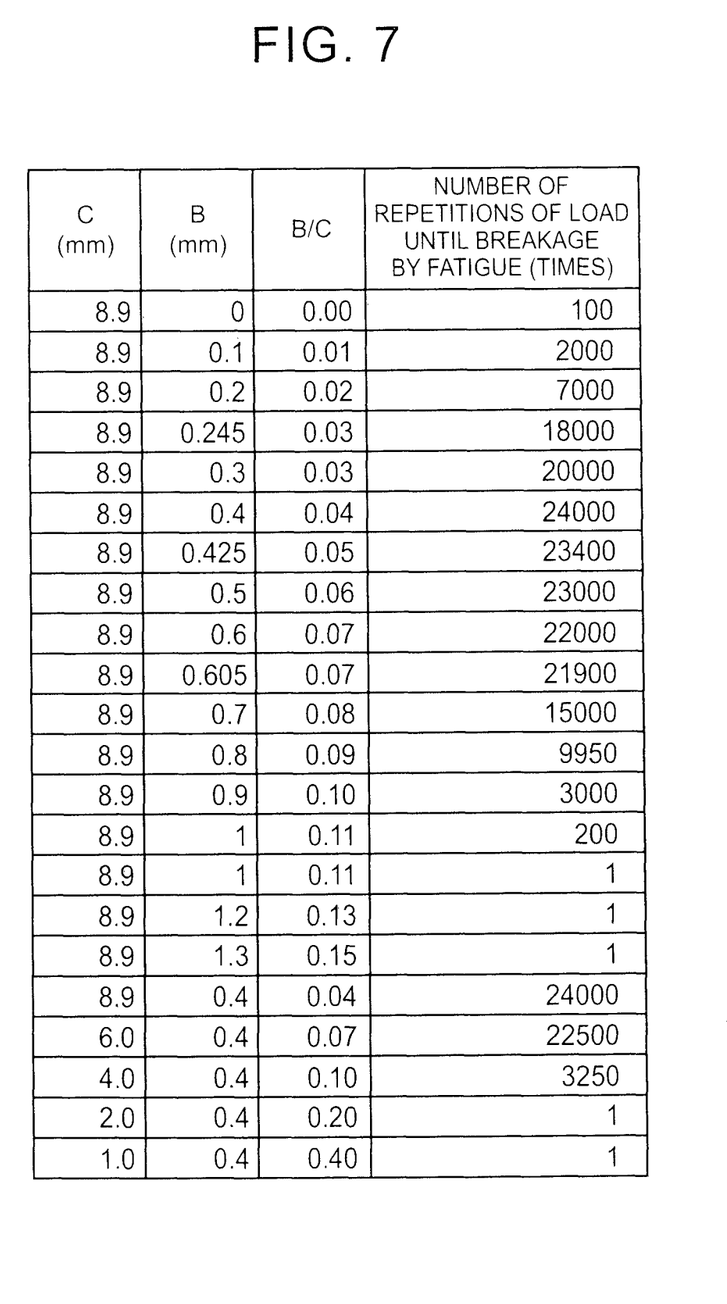
FIG. 7 is a table for showing results of a repeated test.

The inventor conducted a repeated test on the increase in the internal pressure by changing the B/C variously. FIG. 7 shows values of the B/C in the repeated test and the number of repetitions until the casing of the battery pack 10 is broken. Here, the external size of the battery pack is approximately 140 mm×14 mm×63 mm. A length of the long side 12a is 140 mm, and a length of the short side 12b (see FIG. 2A) is 14 mm. The magnitudes of C and B are as shown in FIG. 7. The details of the test is as follows. The case 12 was formed with a hole, and the air was pumped in through the hole to increase the internal pressure. Then, the air was removed to equalize the internal pressure with an external pressure. A process just as described was repeated until the welded section was broken. The number of repetitions under no load was 100 times.

Figure 8:
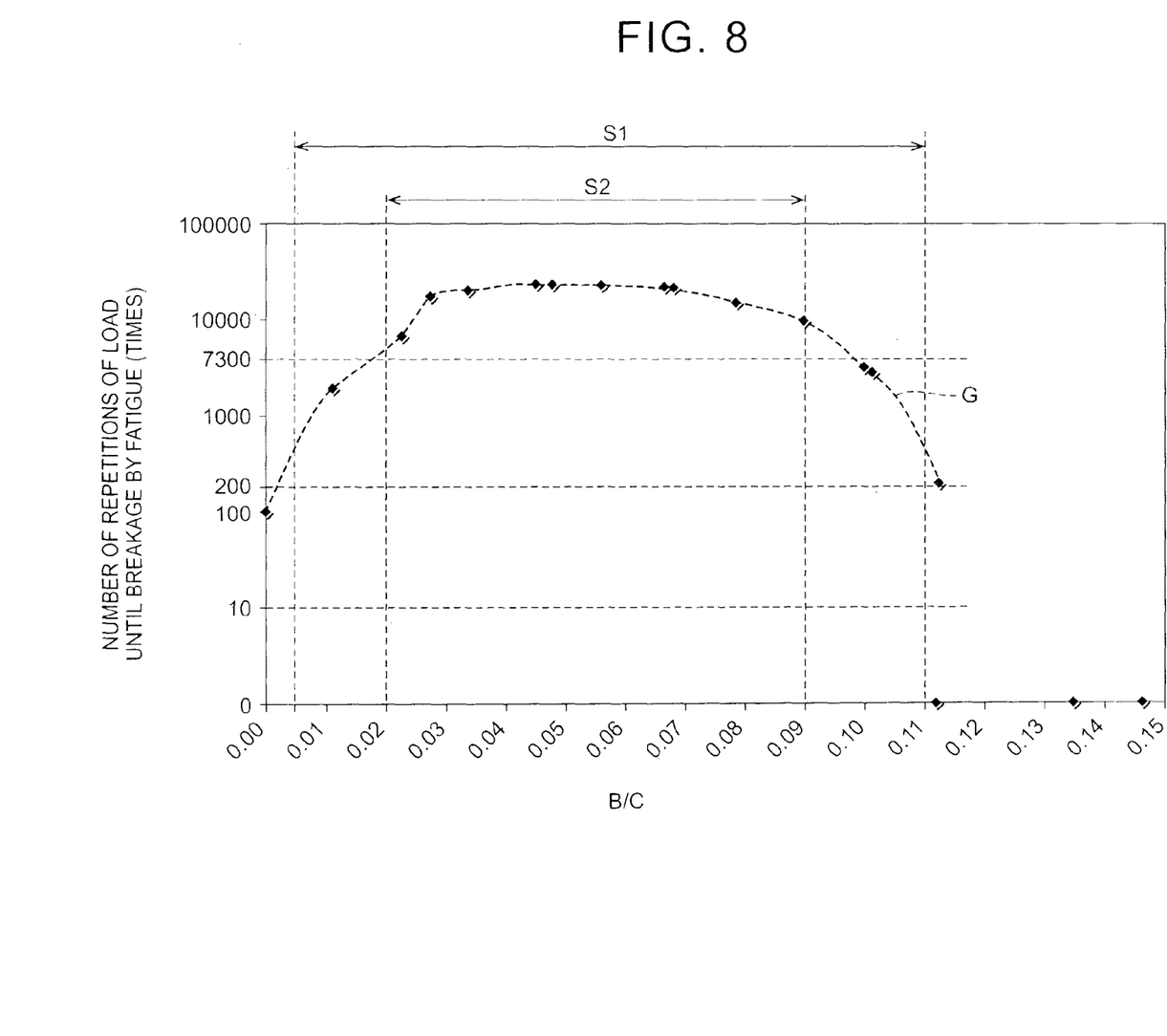
FIG. 8 is a graph for showing results of a repeated durability test.

FIG. 8 is a graph of the result of FIG. 7. As apparent from FIG. 8, when the B/C is too large, an effect of reducing the deterioration by fatigue cannot be obtained. A graph G of a broken line is an approximate curve of a point sequence that indicates the test result. A range indicated by the reference symbol S1 is a range of $0.005 \leq B/C \leq 0.110$. In the range S1, the number of repetitions until breakage is 200 times or more. The number of 200 times is twice as large as the number of repetitions under no load (100 times). That is, the number of repetitions achieved by the battery stack of the present invention is twice as large as that achieved by a conventional battery stack, and this number represents one example of an evaluation standard.

A range indicated by the reference symbol S2 is a range of $0.02 \leq B/C \leq 0.09$. In this region, the number of repetitions until breakage is 7,000 times or more. If the inflation occurs twice a day, it is repeated 7,300 times for 10 years. Thus, the range indicated by the reference symbol S2 corresponds to a range in which the welded section is durable for 10 years when the twice-a-day inflation is assumed. As a component mounted in an automobile, the battery stack preferably has a service life of 10 years. The range S2 passes the standard.

According to the consideration of the inventor, it is estimated that the above-mentioned standard that adopts the B/C as a parameter of dimensionless numbers is established without relying on the size of the battery pack. As shown in FIG. 6, the B/C corresponds to an inclination angle of the range of the flat surface (the range indicated by the reference symbol 12d) with respect to the plane (the YZ-plane) that is orthogonal to the stacking direction, the range being from the lower end (the portion indicated by the reference symbol P5 in FIG. 6) of the contact region between the flat surface of the case 12 and the lateral surface of the sealing plate 13 to the upper end (the portion indicated by the reference symbol P6 in FIG. 6) of the contact range between the flat surface and the spacer 5. Regardless of the size of the battery pack, as long as the inclination angle falls in the above range of S1 or S2, it is possible to, obtain the desired effect of reducing the deterioration by fatigue.

(Modified Embodiment)

Figure 9:
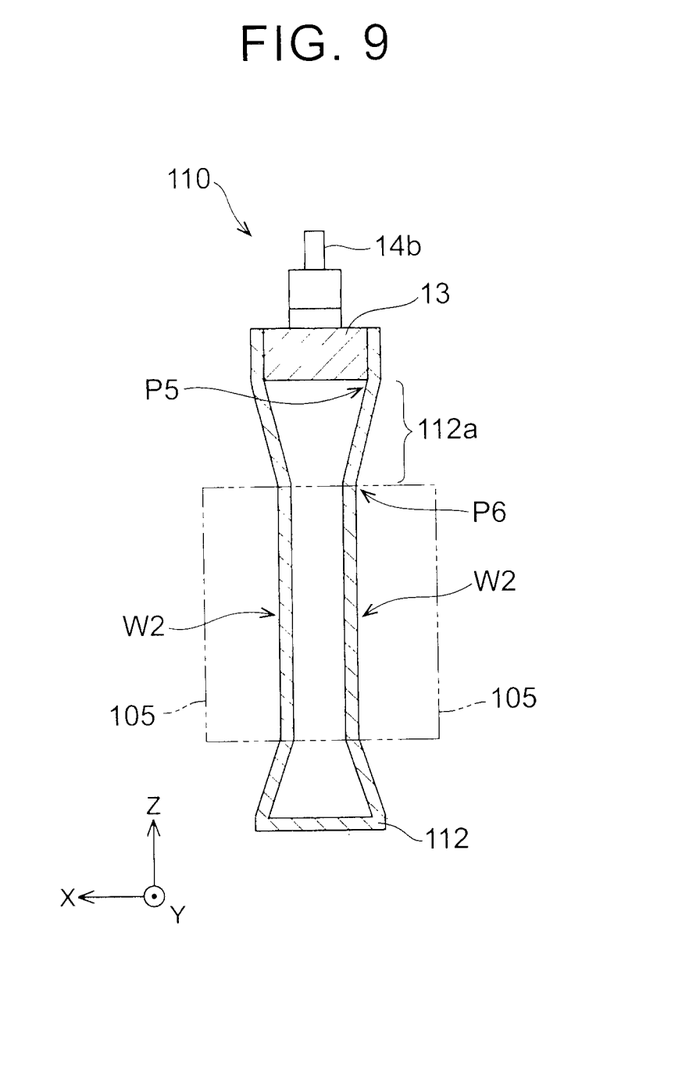
FIG. 9 is a cross-sectional view for showing a modified embodiment of the battery pack.

As described above, the flat surface is not recessed when no load is applied to the battery pack, and it is preferred to apply the load until the flat, surface obtains the specified recess. Although the same effect that is achieved by the above battery pack cannot be obtained, the battery pack that is formed with the recess W from the beginning can also have the improved durability against the deterioration by fatigue in comparison with the conventional battery pack. An example of the battery pack in such an aspect is shown in FIG. 9. A battery pack 110 in FIG. 9 is the same as the battery pack 10 shown in FIG. 6; however, it is different from the battery pack 10 in FIG. 6 in a point that a recess W2 is formed with no application of load. A rectangle indicated by a phantom line (a two-dotted chain line) corresponds to the spacer 5. Thus, a bent portion of the flat surface that is indicated by the reference symbol P6 corresponds to the upper end of the contact range between the flat surface and the spacer 5. The inclination of an inclined flat surface 112a that is between the above-described upper end P6 and the lower end (the portion indicated by the reference symbol P5 in FIG. 9) of the contact region between the flat surface of a case 112 and the lateral surface of the sealing plate 13 is the same as the inclination of the flat surface 12d in FIG. 6 that is inclined when receiving the load. Also for a battery stack using the battery pack 110, the load that can retain the recess W2 even with the increase in the internal pressure is required.

The battery stack using the battery pack in FIG. 9 can be expressed as follows. The battery pack 110 includes: the case 112 that is a flat case for housing the battery main body (not shown) therein and has an opened narrow width surface; and the sealing plate 13 that is fitted to an inner peripheral surface of an opening of the case 112 and has the lateral surface welded together with the inner peripheral surface of the case. A spacer 105 is arranged at the center of the flat surface on each side of the each battery pack 110, and a contour of a contact region of the spacer 105 with the flat surface is smaller than a contour of the flat surface of the battery pack 110. In the battery stack, the plurality of battery packs 110 and the plurality of spacers 105 are alternately stacked, and the load is applied in a stacking direction thereof. Then, the center of the flat surface of the battery pack 110 is recessed in a shape of the contour of the spacer 105 (the recess W2). When the battery pack is seen in the cross section that crosses the sealing plate and the spacer in the stacking direction, the flat surface is linearly inclined with respect to, a direction orthogonal to the stacking direction from the lower end P5 of the contact region between the flat surface and the sealing plate 13 to the upper end P6 of the contact region between the flat surface and the spacer 105.

A description is now made on remarks of the technique described in the embodiment. The spacer 5 needs to abut against the substantial center of the flat surface. Conversely, the spacer 5 needs to abut against the battery pack in a manner not to overlap with an edge of the flat surface when seen in the stacking direction. The edge of the flat surface corresponds to a corner of the case. Since the corner originally has high rigidity, there is no advantage of abutting the spacer. On the other hand, the central portion of the flat surface is likely to be inflated by the increase in the internal pressure. Accordingly, the inflation can be suppressed by abutting the spacer against such a portion and applying the load thereto.

Concrete examples of the present invention have been described so far. However, they are merely examples and thus do not limit the claims. The techniques described in the claims include various changes and modifications that are made to the above-mentioned concrete examples. The technical elements that are described in this specification and the drawings demonstrate technical utility when used singly or in various combinations, and thus are not limited to the combinations described in the claims in the original application. Furthermore, the techniques that are exemplified in this specification and the drawings achieve a plurality of objects simultaneously, and the achievement of one object thereof itself has technical utility.

The invention claimed is:

1. A battery stack comprising:
   a plurality of battery packs, wherein each one of the plurality of battery packs includes a case and a sealing plate, the case housing a battery main body in the case, the case being flat and having an opening, the opening having a narrow width, the sealing plate being fitted to an inner peripheral surface of the opening of the case, a lateral surface of the sealing plate being welded to the inner peripheral surface of the case; and a plurality of spacers each arranged at a center of a flat surface on each side of each one of the plurality of battery packs and each of the plurality of spacers having a contact region that is smaller than a contour of the flat surface of each of the plurality of battery packs, the plurality of spacers being alternately stacked with the plurality of battery packs, the plurality of spacers and the plurality of battery packs being applied with a load in a stacking direction, and the center of the flat surface of each of the plurality of battery packs being recessed in a shape of a contour of each of the plurality of spacers by the load, wherein a relationship between a depth and a distance satisfies $0.005 \leq B/C \leq 0.11$ in a cross section of each of the plurality of battery packs and each of the plurality of spacers, the cross section crosses the sealing plate and each of the plurality of spacers in the stacking direction, wherein B represents a depth of the recess and C represents a distance from a lower end of the sealing plate to an upper end of each of the plurality of spacers.

2. The battery stack according to claim 1, wherein the relationship satisfies $0.02 \leq B/C \leq 0.09$.

3. The battery stack according to claim 1, wherein the flat surface is linearly inclined with respect to a direction orthogonal to the stacking direction from a lower end of a contact region between the flat surface and the sealing plate to an upper end of a contact region between the flat surface and each of the plurality of spacers in the cross section of each of the plurality of battery packs and each of the plurality of spacers.

* * * * *